No. 607,985. Patented July 26, 1898.
W. E. CUTLER.
SELVAGE MOTION FOR LOOMS.
(Application filed Nov. 11, 1897.)
(No Model.) 2 Sheets—Sheet 1.
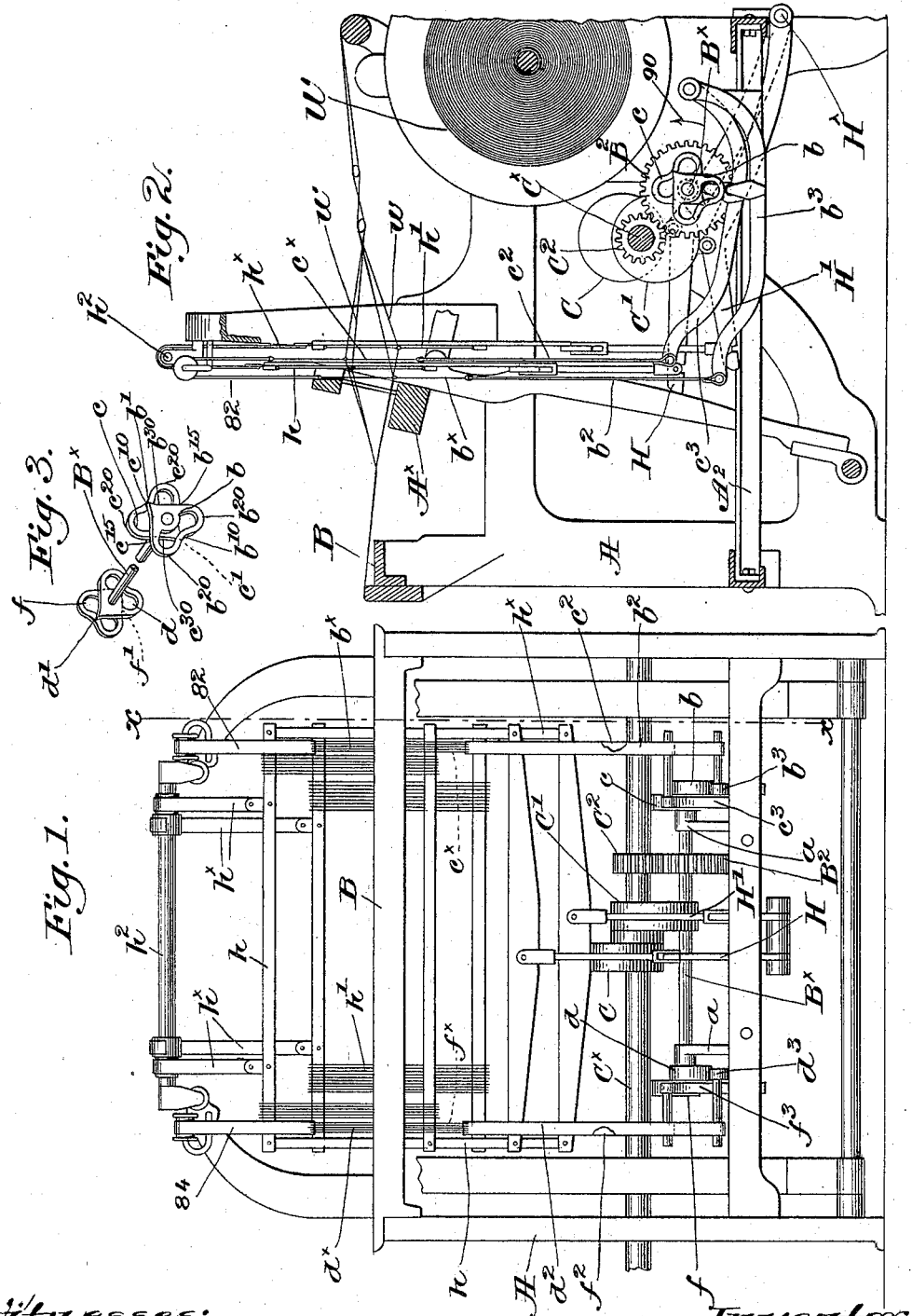

No. 607,985. Patented July 26, 1898.
W. E. CUTLER.
SELVAGE MOTION FOR LOOMS.
(Application filed Nov. 11, 1897.)
(No Model.) 2 Sheets—Sheet 2.
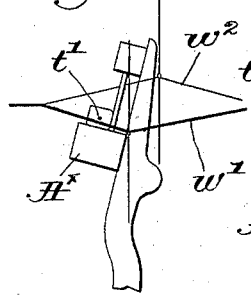
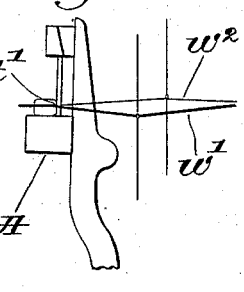
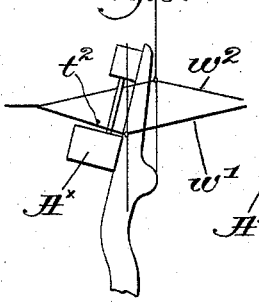
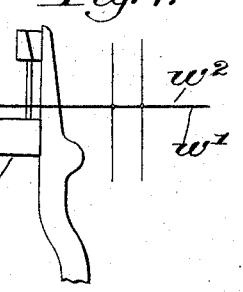
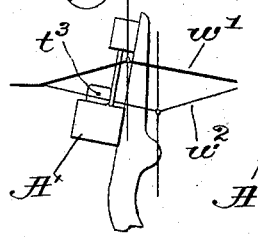
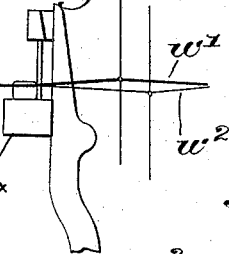
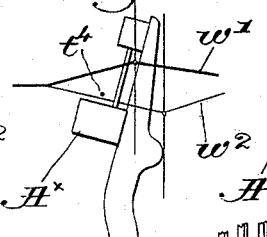
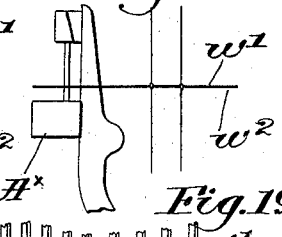
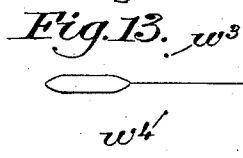
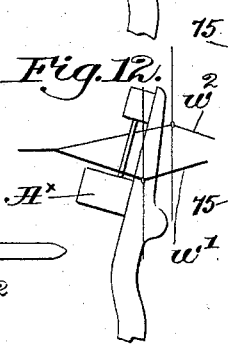
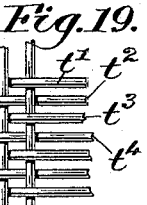
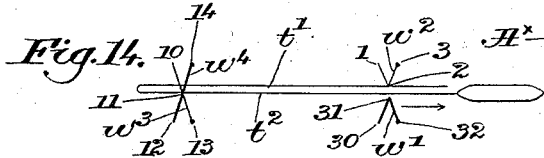
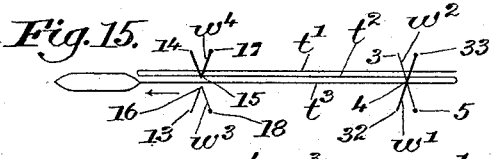
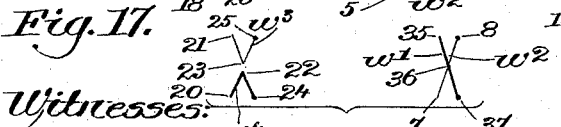
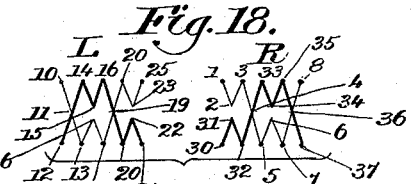
Witnesses:
A.C. Harmon
Edward F. Allen
Inventor:
Willie E. Cutler
by Crosby Gregory
attys.

UNITED STATES PATENT OFFICE.

WILLIE E. CUTLER, OF LEWISTON, MAINE, ASSIGNOR TO THE DRAPER COMPANY, OF PORTLAND, MAINE, AND HOPEDALE, MASSACHUSETTS.

SELVAGE-MOTION FOR LOOMS.

SPECIFICATION forming part of Letters Patent No. 607,985, dated July 26, 1898.

Application filed November 11, 1897. Serial No. 658,110. (No model.)

*To all whom it may concern:*

Be it known that I, WILLIE E. CUTLER, of Lewiston, county of Androscoggin, State of Maine, have invented an Improvement in Selvage-Motions for Looms, of which the following description, in connection with the accompanying drawings, is a specification, like letters and figures on the drawings representing like parts.

This invention has for its object the production of a selvage-motion for looms whereby undue strain on the selvage-threads is prevented, while the threads at the selvage weave in a different manner from those in the body of the cloth.

Heretofore in selvage-motions the selvage-sheds are left open while the lay beats up the filling, thereby causing considerable unnecessary strain on the selvage-threads.

In this present invention the selvage-motion is so constructed and arranged that the selvage-sheds are nearly closed while the lay beats up, thus obviating any undue strain on the selvage-threads and acting to produce a better and more uniform finished fabric.

The selvage-motion cams are of special and novel construction, and they produce a peculiar movement of the selvage-shedding mechanism which effects the desired result.

Figure 1 is a front elevation of a sufficient portion of a loom to be understood with my novel selvage-motion applied thereto, the lay being omitted. Fig. 2 is a vertical view thereof, taken on the line $x\ x$, Fig. 1, looking toward the left. Fig. 3 is a perspective view, partially broken out, of the selvage-cam shaft and cams thereon, showing the relative position of the cams. Figs. 4 to 12 show successive positions of the selvage-shed at one side of the loom during one complete rotation of the selvage-cam shaft. Figs. 13 to 17 are diagrammatic views of the changes in position of the selvage-sheds at both sides of the cloth for four consecutive picks. Fig. 18 is a diagrammatic view showing graphically the movement of the selvage-threads through a complete cycle; and Figs. 19 and 20 are enlarged views in plan and end elevation of a portion of the selvage, the weave between the selvages being shown in Fig. 19.

The loom-frame A, breast-beam B, lay $A^\times$, the main-harness cam-shaft $C^\times$, the main harnesses $h\ h'$, by which the shedding of the warps $w$ is effected for the main or body portion of the cloth, and the warp-beam W may be and are all as usual and well known in looms.

The body of the cloth is shown for simplicity as woven by a two-harness motion, the harness-frames $h\ h'$ being connected by usual flexible connections $h^\times$, attached to the rotatable shaft $h^2$, the foot of the frame $h$ being connected with a lever H, provided with a suitable stud or roll engaged and depressed by a cam C on the shaft $C^\times$, a second cam $C'$ thereon acting on a roll carried by and to depress a lever $H'$, connected with the foot of the harness-frame $h'$, said levers being suitably fulcrumed at $H^\times$.

Cross-girths $A^2$, Fig. 2, are provided with stands $a$, forming bearings (see Fig. 1) for a selvage-cam shaft $B^\times$, having fast thereon a gear $B^2$ in mesh with a smaller gear $C^2$ on the main-cam shaft $C^\times$, the relative number of teeth in the two gears being such that the gear $C^2$ makes two complete revolutions for one revolution of the gear $B^2$, the latter gear and its shaft $B^\times$ being rotated in the direction of arrow 90, Fig. 2.

Upon the cam-shaft $B^\times$ four like cams are arranged in pairs $b\ c$ and $d\ f$, as best shown in Fig. 3, the cams being substantially heart-shaped, the points $b'\ d'$ of the cams $b\ d$ being diametrically opposite the centers of the cams $c\ f$, respectively, and vice versa, and viewing Fig. 3 the cams are set quartering upon the shaft with the points $b'\ d'$ ninety degrees apart, the same angle separating the points $c'$ and $f'$.

Each selvage has its own harness-frames— $b^\times\ c^\times$ at the right-hand side of the loom, $d^\times\ f^\times$ at the left-hand side, the former pair being connected by straps $b^2\ c^2$, respectively, with treadles $b^3\ c^3$, provided with suitable rolls which are engaged and controlled by the cams $b$ and $c$, respectively, the frames having an overhead connection 82. At the other side of the loom the cams $d\ f$ act, respectively, upon the treadles $d^3\ f^3$, connected by straps $d^2 f^2$ with the corresponding selvage-harnesses $d^\times f^\times$, the latter having a flexible overhead connection 84, as herein shown.

In Fig. 2 only the right-hand selvage-shedding mechanism is shown to avoid confusion; but it will be seen from Figs. 1 and 2 that the main shed and both the selvage-sheds are open preparatory to the passage of the shuttle therethrough, and viewing Fig. 2 the front selvage-harnesses are shown in front of the plane of the main-harness frame $h$, while the rear selvage-harnesses are back of the plane of the frame $h$ and in front of that of the back plane $h'$.

In following out the operation of the apparatus by aid of Figs. 4 to 12, inclusive, only the shedding of the right-hand selvage-motion is shown, the operation of the other selvage-motion being easily understood therefrom, the selvage-warps $w'$, passing through the front harness, being indicated by a heavy line, the warps $w^2$ through the rear harness being indicated by a lighter line.

In Fig. 4 the parts shown are as illustrated in Fig. 2, and the filling $t'$ has been laid for the first pick, the position of the selvage-threads at both sides being shown diagrammatically at $w'$ $w^2$ and $w^3$ $w^4$ in Fig. 13, and as the lay beats in the filling, Fig. 5, the main-warp shed is nearly closed. The right-hand selvage-warps approach each other, as in Fig. 5, due to one-eighth rotation of the selvage cam-shaft $B^\times$, moving from 1 to 2 and from 30 to 31, Fig. 14, while the same partial rotation of cams $d$ and $f$ causes the left-hand selvage-warps $w^3$ $w^4$ to close, as from 10 to 11 and from 12 to 11.

In Fig. 6 the lay is back, the second pick $t^2$ is laid, and another one-eighth turn of the shaft $B^\times$ opens the right-hand selvage-shed, the movement being from 2 to 3 for warps $w^2$ and from 31 to 32 for warps $w'$, Fig. 14, while the cams $d$ and $f$ have effected the crossing of the warps $w^3$ $w^4$, the movement being from 11 to 13 and 11 to 14, Fig. 14. The lay beats up the second pick, Fig. 7, and cams $b$ and $c$ act on the third eighth of the rotation of shaft $B^\times$ to close the right-hand selvage-shed, warps $w^2$ moving from 3 to 4 and warps $w'$ from 32 to 4, Fig. 15, and at the same time the cams $d$ and $f$ cause warps $w^3$ and $w^4$ to approach each other, the former from 14 to 15, Fig. 15, and the latter from 13 to 16.

In Fig. 8 the third pick $t^3$ has been made; but the shaft $B^\times$ has now made one-half a complete rotation and the warps $w'$ $w^2$ have been crossed, with the former now in the upper plane of the shed, the movement being shown in Fig. 15 from 4 to 33 for $w'$ and from 4 to 5 for $w^2$. At the same time warps $w^4$ and $w^3$ have been separated without crossing—that is, from 15 to 17 for $w^4$ and from 16 to 18 for $w^3$, Fig. 15—and when the lay beats up, as in Fig. 9, the additional eighth revolution of shaft $B^\times$ causes warps $w'$ and $w^2$ to approach, as from 33 to 34 and 5 to 6, Fig. 16, while warps $w^3$ $w^4$ close their shed, or from 18 to 19 for $w^3$ and from 16 to 19 for $w^4$. (See Fig. 16.) The fourth pick $t^4$ has been made in Fig. 10, and the shaft $B^\times$ has made in all three-quarters of a revolution, separating the warps $w'$ $w^2$, without crossing them, or, as in Fig. 16, from 34 to 35 for the former and from 6 to 7 for the latter. At the same time the warps $w^3$ $w^4$ have been crossed and separated to open the shed or from 19 to 20 for $w^4$ and from 19 to 21 for $w^3$, Fig. 16, it being understood that the separation of the selvage-sheds is always before the filling is laid. When the lay beats up the fourth pick or filling $t^4$, as in Fig. 11, the right-hand selvage-warps will be closed, while the left-hand selvage-warps will be brought near each other.

As shown in Fig. 17, warp $w^3$ moves from 21 to 23, $w^4$ from 20 to 22, while $w'$ moves from 35 to 36, and $w^2$ from 7 to 36, and the shaft $B^\times$ will have made seven-eighths of a revolution. As the revolution of said shaft is completed the warps $w'$ $w^2$ will be crossed and the shed opened, Fig. 12, bringing said warps into the original position (shown in Fig. 4) ready for the fifth pick, while the warps $w^3$ $w^4$ will be separated to open the shed, but without crossing, these warps also being in the original position, and a complete cycle of movements will have been made. Diagrammatically the warps $w'$ will in the last eighth of the movement move from 36 to 37 and warps $w^2$ from 36 to 8, as in Fig. 17, while warps $w^3$ move from 23 to 25 and warps $w^4$ from 22 to 24.

By reference to Fig. 19 it will be seen that the selvage-motion gives a different weave to the selvage from that in the body of the cloth, the filling being shown in the selvage as crossing the warp in pairs—that is, for two picks the filling will be above, and for the next two picks below, a given warp-thread, while in the body of the cloth it is one up and one down. When the selvage-warps are crossed, the filling is carried around the endmost warp, as at 75, Figs. 19 and 20, to thus give the finished edge to the cloth, the carrying around of the filling alternating at opposite edges.

In Fig. 18 the movement of the left-hand set of selvage-warps is graphically represented at L, while the movement of the right-hand selvage-warps is similarly shown at R, the picks of filling being omitted. From an inspection of this figure it will be seen that one set of selvage-warps cross each other when the other set nearly approach each other, and vice versa, and also that during a complete cycle—that is, one revolution of the selvage cam-shaft $B^\times$—each set of selvage-warps cross twice. The approach of the selvage-warps to each other, whether followed by crossing or separation, takes place as the lay beats up the filling, and thus the selvage-warps are relieved of any unnecessary strain due to beating up, so that the selvage-warps are strained but little, if any, more than the main warps. This produces a stronger and much more uniform web of cloth, free from wrinkles and stretched places in the selvage. The two pairs of selvage-cams are positioned alike, each relative to its fellow, and all of the cams have the same shape and dimensions. Consequently a detailed description of one will suffice for all. The parts $b^{30}$ of cam $b$ are nearest the center of the shaft, the point $b'$ somewhat more distant and equally so with the portion $b^{10}$, and $b^{15}$ is set farther from the center, while the lobes $b^{20}$ are the farthest from the center. Now regarding cams $b$ and $c$, in the position shown in Figs. 1, 2, and 3 the treadle-rolls are engaged by lobe $b^{20}$ and part $c^{30}$, separating the treadles the maximum distance and opening wide the shed of the selvage-warps, as shown in Fig. 4. In the next position the rolls are engaged by parts $b^{10}$ and $c'$, acting to nearly close the shed, as in Fig. 5, while the following position restores the treadles to the starting position, the rolls engaging lobe $b^{20}$ and opening wide the shed, as in Fig. 6. Now the rolls engage the immediate adjacent parts $b^{15}$ and $c^{15}$, and they being equidistant from the center of the shaft $B^\times$ the shed is completely closed, as shown in Fig. 7. Further rotation brings the rolls into engagement with parts $c^{20}$ and $b^{30}$, so that the shed is opened wide; but this time the action is just the reverse of the prior one, and the warps are crossed, those formerly in the lower plane being brought into the upper plane of the shed, and vice versa, as shown in Fig. 8. Then the warps are moved by the cams to nearly close the shed, as in Fig. 9, next to open it wide, Fig. 10, and thereafter to completely close the shed, as in Fig. 11. The next movement of the cams operate to again cross the warps and open the shed, as in Fig. 12, wherein the warps are shown in the same position as in Fig. 4, it being remembered that the movement of rotation of the cams has been divided into eight equal parts in order to make the same clear.

Having fully described my invention, what I claim, and desire to secure by Letters Patent, is—

1. In a loom, independent shed-forming mechanism for each selvage, and means to nearly close the shed in one and to cross the selvage-warps of the other mechanism, for the same pick, and vice versa.

2. In a loom, independent shed-forming mechanism for each selvage, and means to nearly close the shed for two successive picks, cross the warp-threads, and nearly close the shed on the next two successive picks respectively, the crossing of the warps at one selvage occurring while the warps at the other selvage are nearly closed.

3. In a loom, independent shedding mechanism at each selvage, including actuating-treadles, a cam-shaft, controlling-cams for said treadles, arranged in pairs upon the shaft, said cams being substantially heart-shaped and oppositely set for each pair, so that the four cams are set quartering and means to rotate the cam-shaft, whereby the shed at one selvage is closed and the warps at the other selvage are crossed, for the same pick, and vice versa.

4. In a loom, independent shed-forming mechanism for each selvage, and controlling means therefor, including a cam-shaft, four like cams thereon set quartering and arranged in pairs, the cams of each pair being set opposite each other, whereby when the shed at one selvage is closed the shed at the other selvage is crossed, at the same pick.

In testimony whereof I have signed my name to this specification in the presence of two subscribing witnesses.

WILLIE E. CUTLER.

Witnesses:
MAUDE M. LYSETH,
GEO. E. MCCANN.